(12) United States Patent
Gao

(10) Patent No.: US 7,854,069 B2
(45) Date of Patent: Dec. 21, 2010

(54) AZIMUTH ANGLE MEASUREMENT SYSTEM AND METHOD FOR OPERATING THE SAME

(75) Inventor: Meng Gao, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/569,568

(22) Filed: Sep. 29, 2009

(65) Prior Publication Data

US 2010/0133825 A1   Jun. 3, 2010

(51) Int. Cl.
  *G01C 1/00* (2006.01)
  *G01C 15/10* (2006.01)
  *F41G 1/00* (2006.01)
(52) U.S. Cl. .......................................... 33/333; 33/1 PT
(58) Field of Classification Search ............ 33/333–334, 33/282–283, 392, 339, 343, 369–371, 374–375, 33/391–393, 304, 308, 313, 1 N, 1 PT, 706, 33/534
See application file for complete search history.

(56) References Cited

U.S. PATENT DOCUMENTS

| | | | | |
|---|---|---|---|---|
| 4,261,564 A * | 4/1981 | Holahan et al. ............. | 473/423 |
| 5,225,626 A * | 7/1993 | Bowers ......................... | 33/392 |
| 6,426,497 B1 * | 7/2002 | Martinez et al. ........ | 250/231.14 |
| 6,459,483 B1 * | 10/2002 | Shafer et al. ................. | 356/247 |
| 6,741,343 B2 * | 5/2004 | Shafer et al. ................. | 356/247 |
| 7,347,668 B2 * | 3/2008 | Pedersen ......................... | 416/1 |
| 7,528,356 B2 * | 5/2009 | Martinez ............... | 250/231.13 |
| 7,665,218 B1 * | 2/2010 | Pinto ............................ | 33/333 |
| 2002/0186365 A1 * | 12/2002 | Shafer et al. ............. | 356/139.1 |
| 2007/0086893 A1 * | 4/2007 | Pedersen ....................... | 416/61 |
| 2009/0039651 A1 * | 2/2009 | Stiesdal ........................ | 290/44 |
| 2009/0087134 A1 * | 4/2009 | Martinez ....................... | 385/12 |
| 2010/0050731 A1 * | 3/2010 | Granig et al. ................. | 73/1.11 |

FOREIGN PATENT DOCUMENTS

EP   1 074 454 B1   12/2005

\* cited by examiner

*Primary Examiner*—Yaritza Guadalupe-McCall
(74) *Attorney, Agent, or Firm*—James McGinness, Esq.; Armstrong Teasdale LLP

(57) ABSTRACT

An azimuth angle measurement system includes a rotatable ring, a wire coupled at a first end to the ring, a length measurement device configured to measure a length of a portion of the wire that extends from the ring, and a control system configured to determine an azimuth angle based on the length of the portion of the wire extending from the ring.

20 Claims, 5 Drawing Sheets

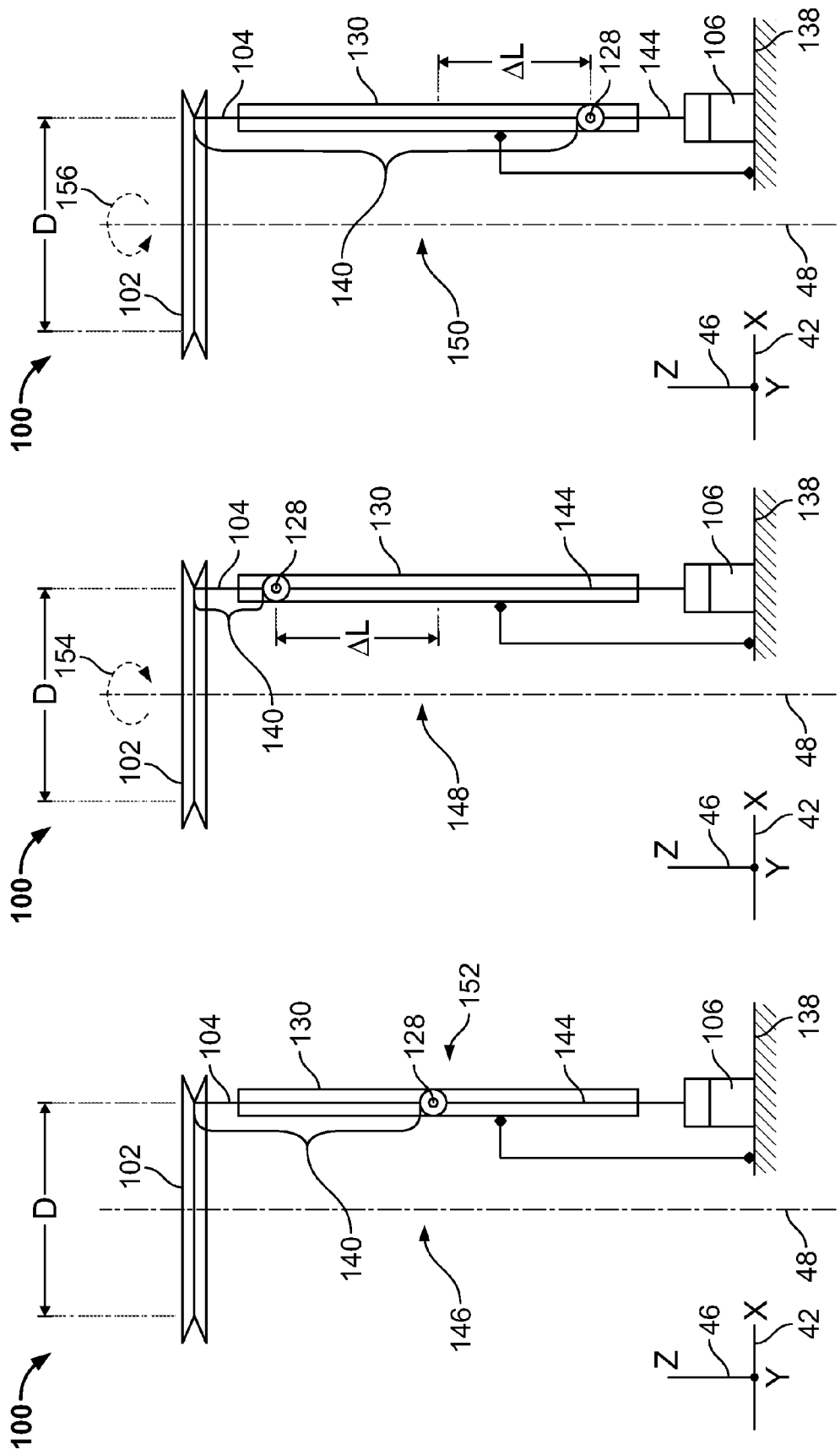

AZIMUTH ANGLE MEASUREMENT SYSTEM AND METHOD FOR OPERATING THE SAME

BACKGROUND OF THE INVENTION

1. Field of the Invention

The embodiments described herein relate generally to an azimuth angle measurement system and, more particularly, to an azimuth angle measurement system for use with a wind turbine.

2. Description of Related Art

At least some known wind turbines include nacelles that pivot about a tower to an azimuth angle corresponding to a direction of the wind. To measure the azimuth angle at which the nacelle is positioned, at least some known wind turbines include azimuth angle measurement systems.

The azimuth angle measurement system may include an encoder within the yaw motors that counts a motor rotation to calculate the azimuth angle. However, the encoder is sensitive to at least some electrical noise, which affects the accuracy of the azimuth angle calculation. Further, special yaw motors that include the encoder are required to be used within the wind turbine to enable the azimuth angle to be calculated.

Another known azimuth angle measurement system includes a plurality of inductive proximity sensors positioned adjacent a yaw ring gear of the wind turbine. The inductive proximity sensors count a yaw ring teeth rotation. More specifically, when teeth of the yaw ring gear pass by each inductive proximity sensor, a pulse signal is generated. The pulse signal indicates a number of teeth that have rotated past the inductive proximity sensor. From the number of teeth, a rotation angle of the nacelle can be calculated to determine the azimuth angle of the nacelle. In at least one known azimuth angle measurement system, two inductive proximity sensors are spaced in a horizontal direction to identify a rotation direction based on which sensor is triggered first in a pulse series.

However, the inductive proximity sensors are sensitive to vibration at a bedplate of the nacelle and/or grease contamination from the yaw ring gear. Further, the pulse signal cannot reflect an absolute azimuth angle directly. Rather, a relationship between the absolute azimuth angle and the number of pulses is used to indirectly determine the azimuth angle. However, the relationship between the absolute azimuth angle and the number of pulses may be lost, especially after maintenance and/or a power transient, such as an unexpected power outage. Moreover, an azimuth angle resolution is limited by a number of teeth of the yaw ring gear, which is fixed by design of the yaw ring gear. For example, if the yaw ring gear includes 128 teeth, the resolution is fixed at 360°/128 teeth, or 2.8° resolution. Such a resolution may be too low to meet at least some requirements of advanced control strategies. Additionally, both the encoder and the inductive proximity sensors require a yaw system having a yaw drive that may not be applicable for other types of yaw systems.

Accordingly, it is desirable to provide an azimuth angle measurement system that may be used with many types of yaw systems. Further, it is desirable to provide an azimuth angle measurement system that is resistant to vibration and/or contamination. Moreover, it is desirable to provide an azimuth angle measurement system that can directly measure the azimuth angle with high resolution.

BRIEF SUMMARY OF THE INVENTION

In one aspect, an azimuth angle measurement system is provided. The azimuth angle measurement system includes a rotatable ring, a wire coupled at a first end to the ring, a length measurement device configured to measure a length of a portion of the wire that extends from the ring, and a control system configured to determine an azimuth angle based on the length of the portion of the wire extending from the ring.

In another aspect, a wind turbine is provided. The wind turbine includes a tower, a nacelle rotatable with respect to the tower, and an azimuth angle measurement system. The azimuth angle measurement system includes a ring coupled to the nacelle and configured to rotate with the nacelle, a wire coupled at a first end to the ring, and a length measurement device coupled with respect to the wire. The length measurement device is configured to measure a length of a portion of the wire that extends from the ring. The azimuth angle measurement system further includes a control system configured to determine an azimuth angle based on the length of the portion of the wire extending from the ring.

In yet another aspect, a method for measuring an azimuth angle of a wind turbine using an azimuth angle measurement system is provided. The azimuth angle measurement system includes a wire coupled to a nacelle of the wind turbine, a plumb coupled to the wire, and a length measurement device coupled with respect to the wire to measure a position of the plumb. The method includes measuring a displacement of the plumb from an initial position using the length measurement device, determining the azimuth angle based on the displacement of the plumb, and outputting the determined azimuth angle.

The embodiments described herein include a length measurement device that measures a length of a wire to determine an azimuth angle based on a relationship between the length of the wire and an amount of rotation of a nacelle.

BRIEF DESCRIPTION OF THE DRAWINGS

FIGS. 1-9 show exemplary embodiments of the systems and method described herein.

FIG. 1 is a perspective view of an exemplary wind turbine.

FIG. 2 is a top view of a nacelle of the wind turbine shown in FIG. 1 at an initial position.

FIG. 3 is a top view of a nacelle of the wind turbine shown in FIG. 1 at a first rotated position.

FIG. 4 is schematic view of an exemplary azimuth angle measurement system that may be used with the wind turbine shown in FIG. 1.

FIG. 5 is a schematic top view of an exemplary ring that may be used with the azimuth angle measurement system shown in FIG. 4.

FIG. 6 is a flowchart of a method that may be used with the azimuth angle measurement system shown in FIGS. 4 and 5.

FIG. 7 is a schematic view of the azimuth angle measurement system shown in FIG. 6 at the initial position.

FIG. 8 is a schematic view of the azimuth angle measurement system shown in FIG. 6 at a first rotated position.

FIG. 9 is a schematic view of the azimuth angle measurement system shown in FIG. 6 at a second rotated position.

DETAILED DESCRIPTION OF THE INVENTION

The embodiments described herein use a length measurement device to measure and/or monitor an azimuth angle of a wind turbine. The embodiments described herein include a ring, a wire, a plumb, and a length measurement device to directly measure the azimuth angle. More specifically, when a nacelle of the wind turbine is at an initial position, the wire is wound several rotations on the ring during pre-installation. When the nacelle rotates from the initial position in a first direction, the wire will unwind from the ring and, when the nacelle rotates in a second direction that is opposite to the first direction, the wire will be wound onto the ring. A change in the length of the wire that is unwound from the ring indicates a change in azimuth angle. As such, the length of the unwound portion of the wire can be measured and monitored by the length measurement device, and the nacelle can be positioned at a desired azimuth angle based on the measurements.

As used herein, the term "vertical" refers to a direction that is substantially parallel to a Z-axis of the wind turbine, the terms "up," "upward," "top," and variations thereof refer to a direction or relative location along a Z-axis of the wind turbine in a positive direction, and the terms "down," "downward," "bottom," and variations thereof refer to a direction or relative location along the Z-axis of the wind turbine in a negative direction.

Figure 1:
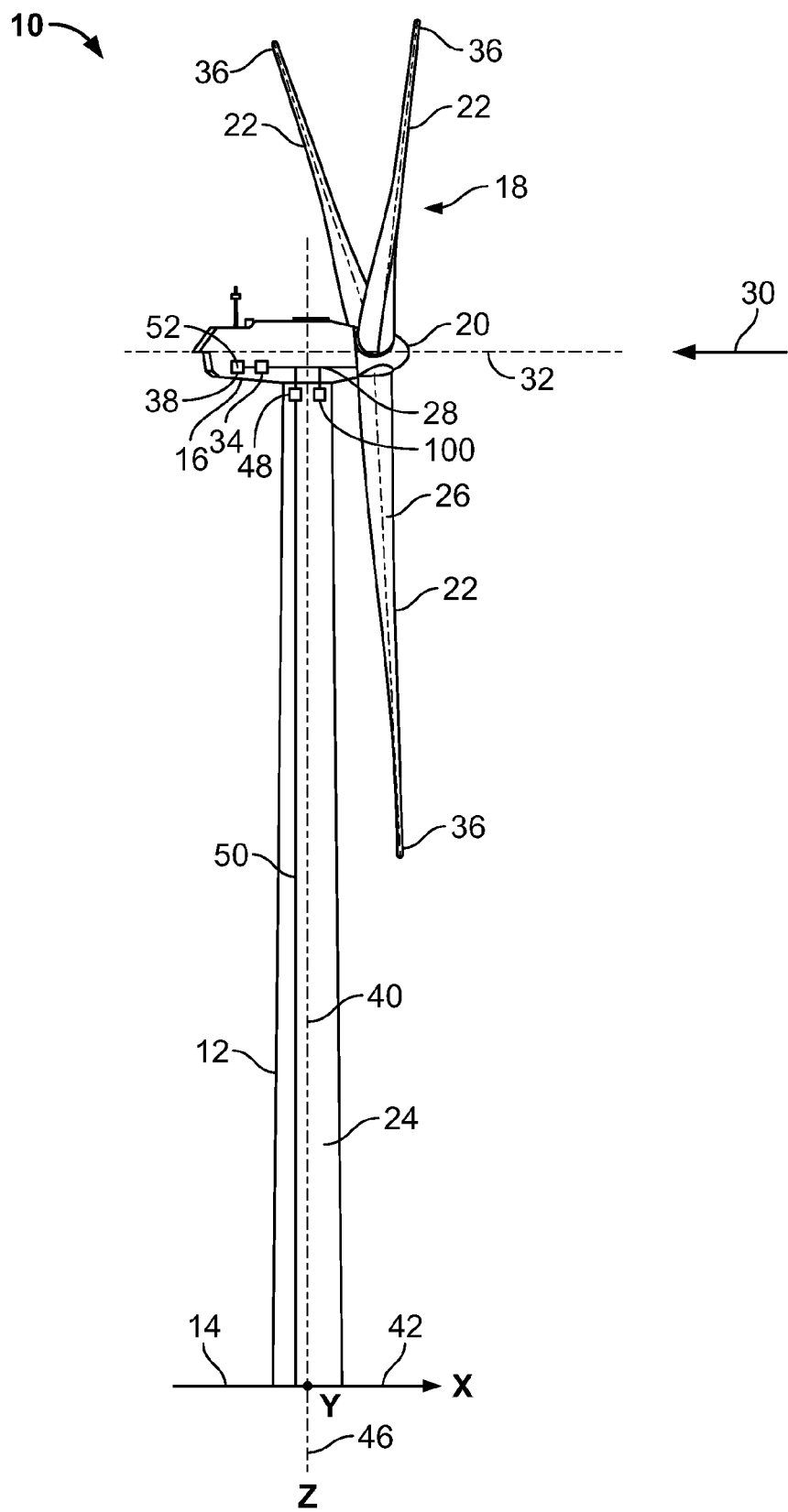
Figure 2:
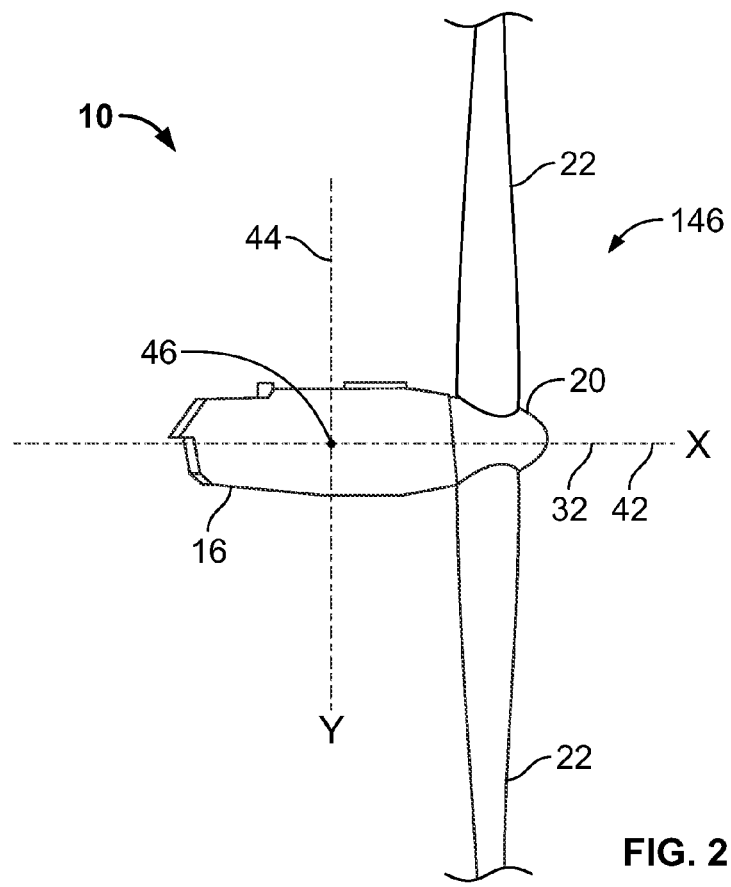
Figure 3:
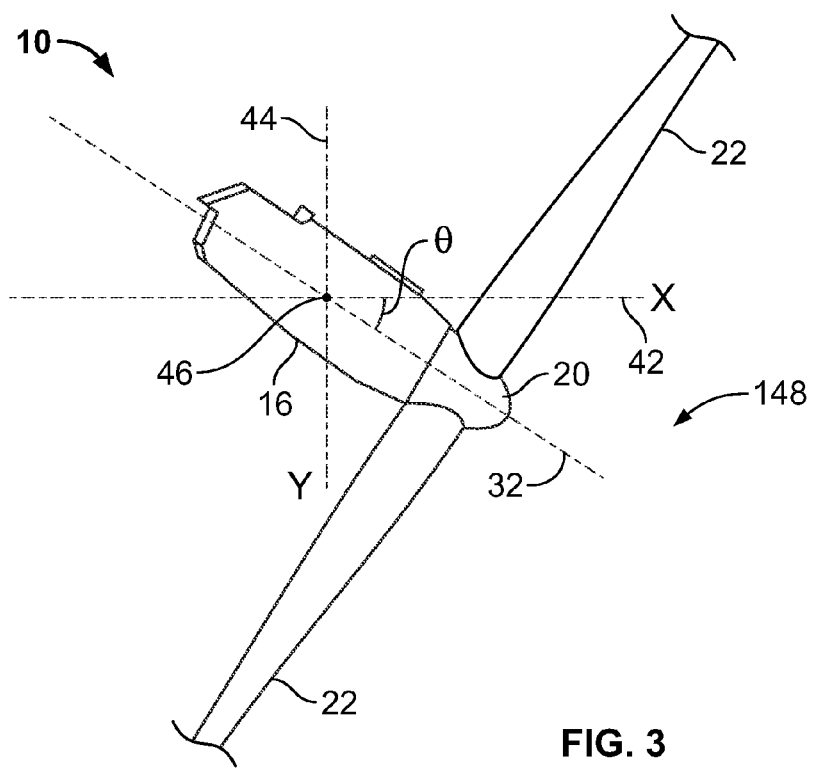

FIG. 1 is a perspective view of an exemplary wind turbine 10. FIG. 2 is a top view of a nacelle 16 of wind turbine 10 at an initial position 146. FIG. 3 is a top view of nacelle 16 at a first rotated position 148.

In the exemplary embodiment, wind turbine 10 is a nearly horizontal-axis wind turbine, however, wind turbine 10 may have any suitable tilt angle. Alternatively, wind turbine 10 may be a vertical axis wind turbine. In the exemplary embodiment, wind turbine 10 includes a tower 12 that extends from a supporting surface 14, a nacelle 16 rotatably mounted on tower 12, and a rotor 18 that is coupled to nacelle 16. Rotor 18 includes a rotatable hub 20 and at least one blade 22 coupled to and extending outward from hub 20. In the exemplary embodiment, rotor 18 has three blades 22. In an alternative embodiment, rotor 18 includes more or less than three blades 22. In the exemplary embodiment, tower 12 is fabricated from tubular steel such that a cavity 24 is defined between supporting surface 14 and nacelle 16. In an alternative embodiment, tower 12 is any suitable type of tower. A height of tower 12 is selected based upon factors and conditions known in the art.

Blades 22 are spaced about hub 20 to facilitate rotating rotor 18 to enable kinetic energy to be transferred from the wind into usable mechanical energy, and subsequently, electrical energy. Blade 22 is mated to hub 20 by coupling a blade root portion 26 to hub 20 at a respective load transfer region 28. Load transfer regions 28 have a hub load transfer region and a blade load transfer region (both not shown in FIG. 1). Loads induced to blades 22 are transferred to hub 20 via load transfer regions 28.

In the exemplary embodiment, blades 22 have a length of more than about 100 meters (m). Alternatively, blades 22 may have any length that enables wind turbine 10 to function as described herein. As wind strikes blades 22 from a wind direction 30, rotor 18 is rotated about an axis of rotation 32. As blades 22 are rotated and subjected to centrifugal forces, blades 22 are also subjected to various forces and moments. As such, blades 22 may deflect and/or rotate from a neutral, or non-deflected, position to a deflected position. Moreover, a pitch angle of blades 22, i.e., an angle that determines a perspective of blades 22 with respect to wind direction 30, may be changed by a pitch adjustment system 34 to control power generated by wind turbine 10 by adjusting an angular position of a profile of at least one blade 22 relative to the wind vector. Pitch axes 36 for blades 22 are shown. In the exemplary embodiment, a pitch of each blade 22 is controlled individually by a control system 38. Alternatively, the blade pitch for all blades may be controlled simultaneously by control system 38.

Further, in the exemplary embodiment, as wind direction 30 changes, a yaw direction of nacelle 16 may be controlled about a yaw axis 40 to position blades 22 with respect to wind direction 30. An angle that nacelle 16 rotates about yaw axis 40 is referred to herein as an azimuth angle $\theta$. Azimuth angle $\theta$ is taken with respect to an X-axis 42 and a Y-axis 44. A Z-axis 46 is parallel to yaw axis 40 and perpendicular to X-axis 42 and Y-axis 44. In the exemplary embodiment, nacelle 16 rotates within an X-Y plane to an azimuth angle that positions blades 22 relative to wind direction 30. In one embodiment, azimuth angle $\theta$ is selected such that axis of rotation 32 is generally parallel to wind direction 30. Azimuth angle $\theta$ of nacelle 16 is controlled using a yaw system 48 coupled between nacelle 16 and tower 12. Control system 38 is coupled in communication, such as operative control communication, to yaw system 48 for control and/or monitoring thereof.

In the exemplary embodiment, control system 38 is shown as being centralized within nacelle 16, however control system 38 may be a distributed system throughout wind turbine 10, on supporting surface 14, within a wind farm, and/or at a remote control center. Further, in the exemplary embodiment, a cable 50 extends from control system 38 to at least supporting surface 14 through cavity 24 to provide a communication link to at least one device exterior to wind turbine 10.

Control system 38 includes a processor 52 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels may include, without limitation, sensors and/or computer peripherals associated with an operator interface, such as a mouse and a keyboard. Further, in the exemplary embodiment, output channels may include, without limitation, a control device, an operator interface monitor and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a PLC cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control commands. The execution of sequences of instructions is not limited to any specific combination of hardware circuitry and software instructions.

Figure 4:
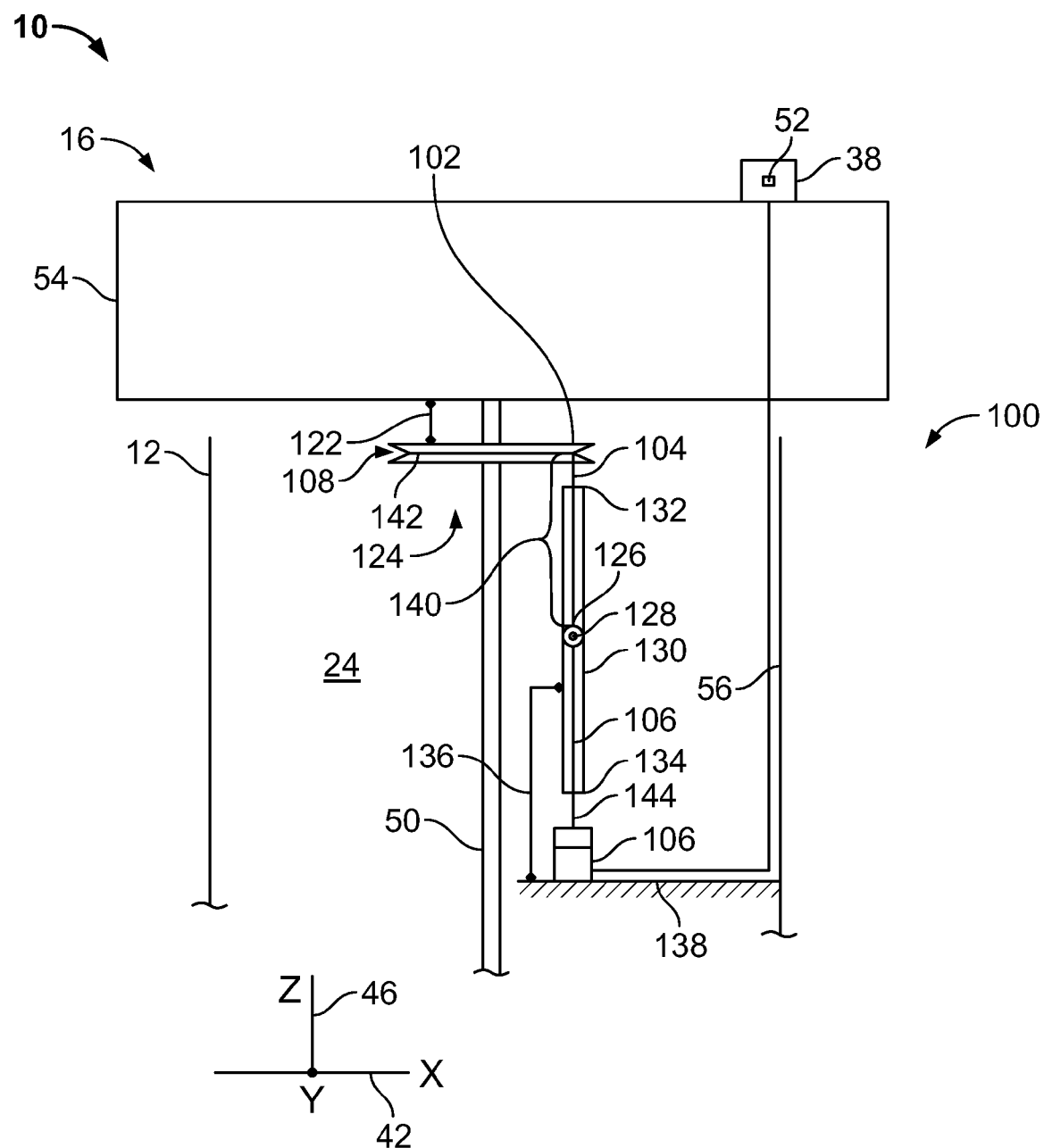
Figure 5:
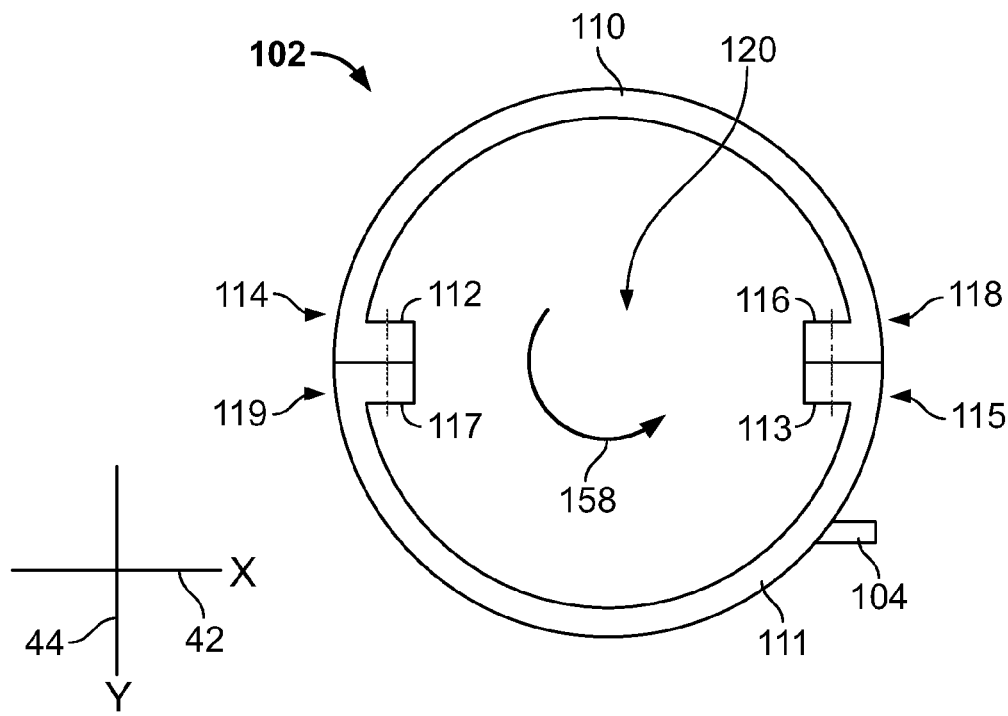

FIG. 4 is schematic view of an exemplary azimuth angle measurement system 100 that may be used with wind turbine 10 (shown in FIG. 1). FIG. 5 is a schematic top view of an exemplary ring 102 that may be used with azimuth angle measurement system 100. In the exemplary embodiment, azimuth angle measurement system 100 includes ring 102, a wire 104, and a length measurement device 106. As referred to herein, the term "wire" refers to a ligament that is flexible and substantially inelastic and/or non-deformable under normal operating conditions. Examples of a wire, as referred to herein, include, without limitation, any suitable cable, cord, line, rope, linkage, and/or wire may be used as wire 104.

In the exemplary embodiment, ring 102 includes a groove 108 defined about a circumference of ring 102. Groove 108 has any suitable configuration that enables wire 104 to be wound about and retained on ring 102. Further, in the exemplary embodiment, ring 102 includes two segments 110 and 111, as shown in FIG. 5. Alternatively, ring 102 may be formed of one unitary piece or include more than two segments 110 and 111. In the exemplary embodiment, segment 110 includes a first flange 112 at a first end 114 thereof and a second flange 116 at a second end 118 thereof. Similarly, segment 111 includes a first flange 113 at a first end 115 thereof and a second flange 117 at a second end 119 thereof. Each flange 112, 113, 116, and/or 117 includes any suitable coupling means, such as a bolt hole, for coupling segments 110 and 111 together at flanges 112 and 113 and flanges 116 and 113. When assembled, segments 110 and 111 define an opening 120 of ring 102. Referring again to FIG. 4, ring 102 further includes a support 122 that couples ring 102 to nacelle 16 at, for example, a base plate 54 of nacelle 16. Support 122 fixes a position of ring 102 with respect to base plate 54 such that ring 102 rotates with base plate 54 and/or nacelle 16.

Wire 104 has a first end 124 that is coupled to ring 102 and a second end 126 that is coupled to a plumb 128. As used herein, the term "plumb" refers to a device that tensions wire 104 when gravity acts upon the device. Examples of a plumb include, without limitation, a weight, and/or any suitable component that removes slack in and/or applies tension to wire 104 while enabling azimuth angle measurement system 100 to function as described herein. In the exemplary embodiment, plumb 128 and at least a portion of wire 104 are positioned within a guide tube 130 that is oriented substantially parallel to Z-axis 46. Wire 104 and plumb 128 are freely movable vertically within guide tube 130 between a top end 132 of guide tube 130 and a bottom end 134 of guide tube 130. Guide tube 130 is coupled to tower 12 using a support 136 such that guide tube 130 is stationary with respect to tower 12. As such, ring 102 and/or nacelle 16 rotate with respect to guide tube 130. In the exemplary embodiment, top end 132 of guide tube 130 is proximate ring 102, and bottom end 134 of guide tube 130 is proximate a frame 138. Guide tube 130 is formed from one or more pieces.

In the exemplary embodiment, support 136 is coupled to frame 138 that extends into cavity 24 from an inner surface 56 of tower 12. Frame 138 is sized to enable a portion 140 of wire 104 that extends from, and/or is not wound about, ring 102 to be oriented substantially parallel to Z-axis 46 and at a substantially right angle to a portion 142 of wire 104 that is wound about ring 102 and/or a diameter D of ring 102. Although unwound portion 140 is referred to below, it should be understood that portion 140 refers to a portion of wire 104 that extends from ring 102. Length measurement device 106 is supported on frame 138 adjacent bottom end 134 of guide tube 130.

Length measurement device 106 is configured to determine a position of plumb 128 within guide tube 130. In the exemplary embodiment, length measurement device 106 is a contact type linear sensor that is coupled to plumb 128 using, for example, a cable 144. Alternatively, length measurement device 106 is a non-contact type length measurement device, such as a laser, an optic, and/or a magnetic length measurement device, that is not coupled to plumb 128. In the exemplary embodiment, length measurement device 106 is coupled in communication with control system 38 for transmitting a measured length of unwound portion 140 of wire 104 to control system 38.

To assemble azimuth angle measurement system 100, a first segment 110 of ring 102 is coupled to base plate 54 using support 122. A second segment 110 of ring 102 is coupled to first segment 110 such that cable 50 extends through opening 120 of ring 102 to supporting surface 14. First end 124 of wire 104 is then coupled to ring 102, and wire 104 is at least partially wound about ring 102. Plumb 128 is coupled to second end 126 of wire 104. Length measurement device 106 is coupled to frame 138 directly below plumb 128 when unwound portion 140 of wire 104 and plumb 128 hang freely from ring 102. Plumb 128 and at least some of unwound portion 140 are inserted into guide tube 130 from top end 132, and cable 144 of length measurement device 106 is inserted into guide tube 130 from bottom end 134. Cable 144 is then coupled to plumb 128. Alternatively, cable 144 is coupled to plumb 128 and guide tube 130 is assembled about unwound portion 140, plumb 128, and/or cable 144. In the exemplary embodiment, guide tube 130 is then coupled to frame 138 using support 136 such that guide tube 130, unwound portion 140, and cable 144 are substantially vertically aligned.

Figure 6:
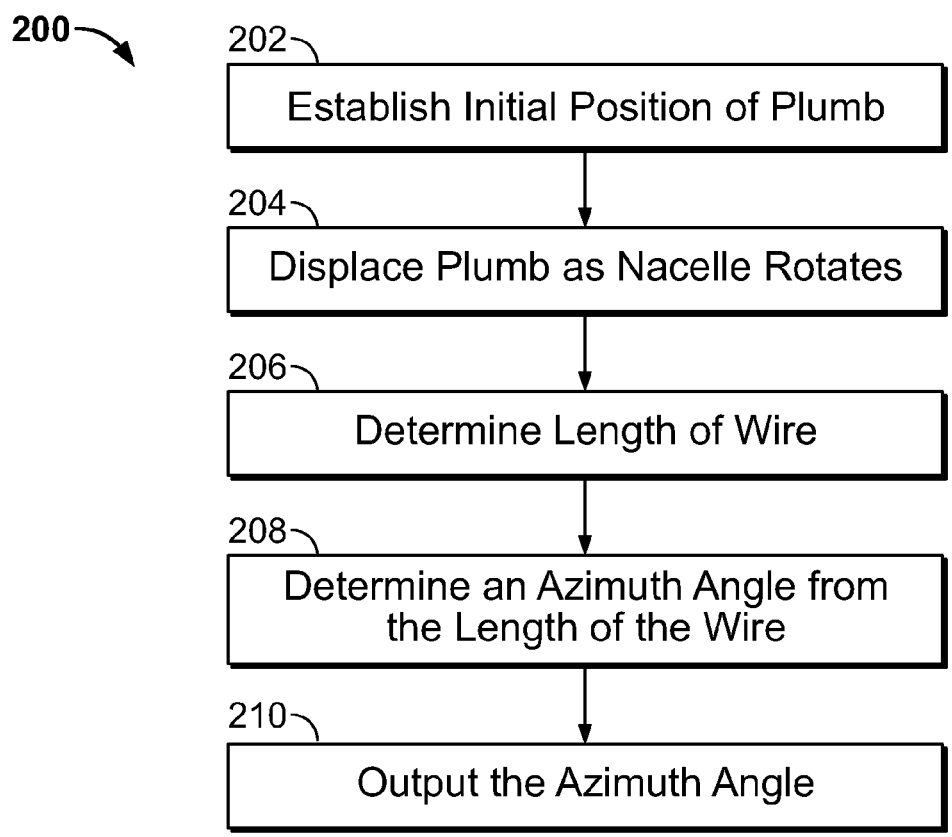

FIG. 6 is a flowchart of an exemplary method 200 that may be used with azimuth angle measurement system 100 (shown in FIGS. 4 and 5). FIG. 7 is a schematic view of azimuth angle measurement system 100 at initial position 146. FIG. 8 is a schematic view of azimuth angle measurement system 100 at first rotated position 148. FIG. 9 is a schematic view of azimuth angle measurement system 100 at a second rotated position 150.

By performing method 200, azimuth angle θ of nacelle 16 is determined. Method 200 is performed by control system 38 (shown in FIGS. 1 and 4) sending commands and/or instructions to components of wind turbine 10. Processor 52 (shown in FIGS. 1 and 4) within control system 38 is programmed with code segments configured to perform method 200. Alternatively, method 200 is encoded on a computer-readable medium that is readable by control system 38. In such an embodiment, control system 38 and/or processor 52 is configured to read computer-readable medium for performing method 200. In the exemplary embodiment, method 200 is automatically performed continuously and/or at selected times. Alternatively, method 200 is performed upon request of an operator of wind turbine 10 and/or when control system 38 determines method 200 is to be performed.

Referring to FIGS. 1-9, azimuth angle measurement system 100 is assembled as described above such that plumb 128 is coupled to nacelle 16 using wire 104 and length measurement device 106 is coupled to tower 12. Method 200 includes establishing 202 initial position 146 of plumb 128, as shown in FIG. 7, and defining a reference azimuth angle at initial position 146. Although in FIG. 7 plumb 128 is located at substantially a middle 152 of guide tube 130, initial position 146 of plumb 128 can be established 202 at any suitable location along guide tube 130. As such, by establishing 202 initial position 146, azimuth angle measurement system 100 is calibrated to define the reference angle at, for example, 0°. Azimuth angle measurement system 100 can be re-calibrated at any suitable time by re-establishing initial position 146 of plumb 128 and assigning initial position 146 the azimuth angle of 0°.

As nacelle 16 rotates in a first direction 154 to first rotated position 148 as shown in FIG. 8, plumb 128 is displaced 204 vertically within guide tube 130. For example, when wire 104 is wound about ring 102 in a counter-clockwise direction 158 as shown in FIG. 5, and nacelle 16 rotates in first direction 154, wire 104 is wound about ring 102 as ring 102 rotates with nacelle 16. The winding of wire 104 displaces 204 plumb 128 upward through guide tube 130. Similarly, as nacelle 16 rotates 204 in a second direction 156 to second rotated position 150 as shown in FIG. 9, plumb 128 is displaced 204 vertically within guide tube 130. More specifically, as nacelle 16 rotates in second direction 156, wire 104 is unwound from ring 102 as ring 102 rotates with nacelle 16. The unwinding of wire 104 moves plumb 128 downward through guide tube 130. Alternatively, when wire 104 is wound in a clockwise direction about ring 102, rotation of nacelle 16 in first direction 154 unwinds wire 104 from ring 102, and rotation of nacelle 16 in second direction 156 winds wire 104 about ring 102.

As plumb 128 is displaced 204 within guide tube 130, length measurement device 106 determines 206 a length of portion 140 of wire 104 that extends from ring 102. In one embodiment, length measurement device 106 determines the length of portion 140 by measuring an absolute length of unwound portion 140 of wire 104. In the exemplary embodiment, length measurement device 106 determines 206 by measuring a displacement of plumb 128 from initial position 146 and calculating a length of unwound portion 140 of wire 104 from the displacement of plumb 128.

Azimuth angle θ is then determined 208 based on the length of portion 140 of wire 104 extending from ring 102. For example, based on diameter D and/or a circumference of ring 102, control system 38 calculates an amount of rotation of nacelle 16 from the measured length of unwound portion 140 of wire 104. In the exemplary embodiment, control system 38 determines 210 azimuth angle θ using the following equation:

$$\theta = \frac{\Delta L}{\pi D / 360}, \quad \text{(Eq. 1)}$$

where ΔL is a change in a length of unwound portion 140 of wire 104 from a previous length, or first length, to a current length, or second length, and D is a diameter of ring 102. Using the direction of a movement of plumb 128, control system 38 can also determine in which direction 154 or 156 nacelle 16 is rotating 204. More specifically, the sign (negative or positive) of the change ΔL indicates a direction of rotation of nacelle 16.

In the exemplary embodiment, an azimuth angle resolution Ra that is obtained using the embodiments described herein is higher than an azimuth angle resolution of known azimuth angle measurement systems. More specifically, a high azimuth angle resolution Ra of azimuth angle measurement system 100 can be easily achieved using the embodiments described herein. For example, when ring 102 has diameter D of 300 millimeters (mm) and length measurement device 106 has a sensor resolution Rs of 0.2 mm (a common precision for length measurement devices), the azimuth angle resolution Ra of azimuth angle measurement system 100 is determined as follows:

$$\frac{\pi D}{360} = 2.6 \text{ mm/degree} = Rr, \quad \text{(Eq. 2)}$$

$$\frac{Rs}{Rr} < 0.08 \text{ degree} = Ra, \quad \text{(Eq. 3)}$$

where Rr is a ring resolution. As will be understood, the azimuth angle resolution can be changed by changing diameter D of ring 102 and a length of wire 104 to correspond to diameter D of ring 102. As such, the sensor resolution Rs of length measurement device 106 is not required to be changed to increase the azimuth angle resolution Ra of azimuth angle measurement system 100.

Control system 38 then outputs 210 the determined azimuth angle θ to a database, a display, a printer, an operator, and/or any other suitable location. The determined azimuth angle θ can be used to control wind turbine 10 more effectively, to reduce a load of wind turbine 10, and/or to generate more power from the wind. In particular embodiments, after calibration of azimuth angle measurement system 100 at an initial installation, an absolute azimuth angle can be determined during a yaw operation and recorded by an absolute encoder within length measurement device 106. Length measurement device 106 then transmits the measured displacement to control system 38 to determine 210 at least azimuth angle θ.

The above-described embodiments determine an azimuth angle by translating rotational movement to linear movement via a ring, a wire, and a plumb. As such, the azimuth angle can be directly determined from a length of a portion of the wire unwound from the ring and/or a position of the plumb. More specifically, the above-described length measurement device and/or control system relates an absolute azimuth angle to a length of unwound wire. Such a relationship is a one-to-one mapping between the absolute azimuth angle and the length of unwound wire.

Further, the embodiments described above are tolerant to vibration and/or contamination, positioned to avoid electrical noise, and independent from a yaw system of the wind turbine. For example, by positioning the length measurement device remote from a yaw system on the above-described frame, the length measurement device is removed from an environment that may contaminate the length measurement device and/or from vibrations caused by the yaw system, the base plate, and/or the nacelle. Moreover, the above-described segmented ring enables the azimuth angle measurement system described herein to be installed in a newly constructed wind turbine or in an existing wind turbine.

A technical effect of the systems and method described herein includes at least one of: (a) measuring a displacement of a plumb from an initial position using a length measurement device; (b) determining an azimuth angle based on a displacement of a plumb; and (c) outputting a determined azimuth angle.

Exemplary embodiments of an azimuth angle measurement system are described above in detail. The method and system are not limited to the specific embodiments described herein, but rather, components of systems and/or steps of the methods may be utilized independently and separately from other components and/or steps described herein. For example, the methods may also be used in combination with other angle measurement systems and methods, and are not limited to practice with only the wind turbine systems and methods as described herein. Rather, the exemplary embodiment can be implemented and utilized in connection with many other angle measurement applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An azimuth angle measurement system, comprising:
   a rotatable ring;
   a wire coupled at a first end to said ring;
   a length measurement device configured to measure a length of a portion of said wire that extends from said ring; and,
   a control system configured to determine an azimuth angle based on the length of the portion of said wire extending from said ring.

2. An azimuth angle measurement system in accordance with claim 1, wherein said ring comprises at least two segments.

3. An azimuth angle measurement system in accordance with claim 1, wherein said control system is configured to establish a reference point at an initial length of the portion of said wire.

4. An azimuth angle measurement system in accordance with claim 3, wherein said control system is configured to determine the azimuth angle based on a change from the initial length of the portion of the wire.

5. An azimuth angle measurement system in accordance with claim 1, further comprising a plumb coupled to a second end of said wire, said length measurement device coupled to said plumb for measuring a displacement of said plumb.

6. A wind turbine, comprising:
   a tower;
   a nacelle rotatable with respect to the tower; and,
   an azimuth angle measurement system comprising:
      a ring coupled to said nacelle and configured to rotate with said nacelle;
      a wire coupled at a first end to said ring;
      a length measurement device coupled with respect to said wire, said length measurement device configured to measure a length of a portion of said wire that extends from said ring; and,
      a control system configured to determine an azimuth angle based on the length of the portion of said wire extending from said ring.

7. A wind turbine in accordance with claim 6, further comprising a plumb coupled to a second end of said wire.

8. A wind turbine in accordance with claim 7, further comprising a guide tube operatively coupled to said tower, said plumb positioned within said guide tube to limit movement of said plumb to a vertical direction that is substantially parallel with a yaw, axis of said wind turbine.

9. A wind turbine in accordance with claim 6, further comprising a frame coupled to an inner surface of said tower, said length measurement device coupled to said frame such that said ring rotates with respect to said length measurement device.

10. A wind turbine in accordance with claim 6, wherein said control system is calibrated at an initial length of said wire.

11. A wind turbine in accordance with claim 10, wherein said control system is configured to determine the azimuth angle based on a change of length of the portion of said wire from the initial length.

12. A method for measuring an azimuth angle of a wind turbine using an azimuth angle measurement system including a wire coupled to a nacelle of the wind turbine, a plumb coupled to the wire, and a length measurement device coupled with respect to the wire to measure a position of the plumb, said method comprising:
   measuring a displacement of the plumb from an initial position using the length measurement device;
   determining the azimuth angle based on the displacement of the plumb; and,
   outputting the determined azimuth angle.

13. A method in accordance with claim 12, further comprising establishing the initial position of the plumb to define a reference azimuth angle.

14. A method in accordance with claim 12, further comprising vertically displacing the plumb as the nacelle rotates with respect to the tower.

15. A method in accordance with claim 14, wherein a ring is coupled to the nacelle and configured to rotate with the nacelle, and the wire is coupled to ring and configured to be wound about the ring, said vertically displacing the plumb comprises displacing the plumb as the ring rotates.

16. A method in accordance with claim 14, wherein the wire is at least partially wound about the ring, said vertically displacing the plumb' comprises one of winding the wire about the ring and unwinding the wire from the ring to displace the plumb.

17. A method in accordance with claim 16, wherein measuring a displacement of the plumb comprises measuring a length of a portion of the wire that extends from the ring using the length measurement device.

18. A method in accordance with claim 16, further comprising rotating the nacelle in a first direction to unwind the wire from the ring such that the plumb is displaced toward the length measurement device.

19. A method in accordance with claim 18, further comprising rotating the nacelle in a second direction opposite the first direction to wind the wire about the ring such that the plumb is displaced away from the length measurement device.

20. A method in accordance with claim 12, wherein determining the azimuth angle based on the displacement of the plumb comprises calculating the azimuth angle as a proportion of a change in a length of a extending portion of the wire from a first length to a second length and a diameter of the ring.

* * * * *